June 13, 1933. J. WALKER 1,913,822
TILTING AXLE AND WHEEL MOUNTING
Filed Oct. 5, 1932  2 Sheets-Sheet 1
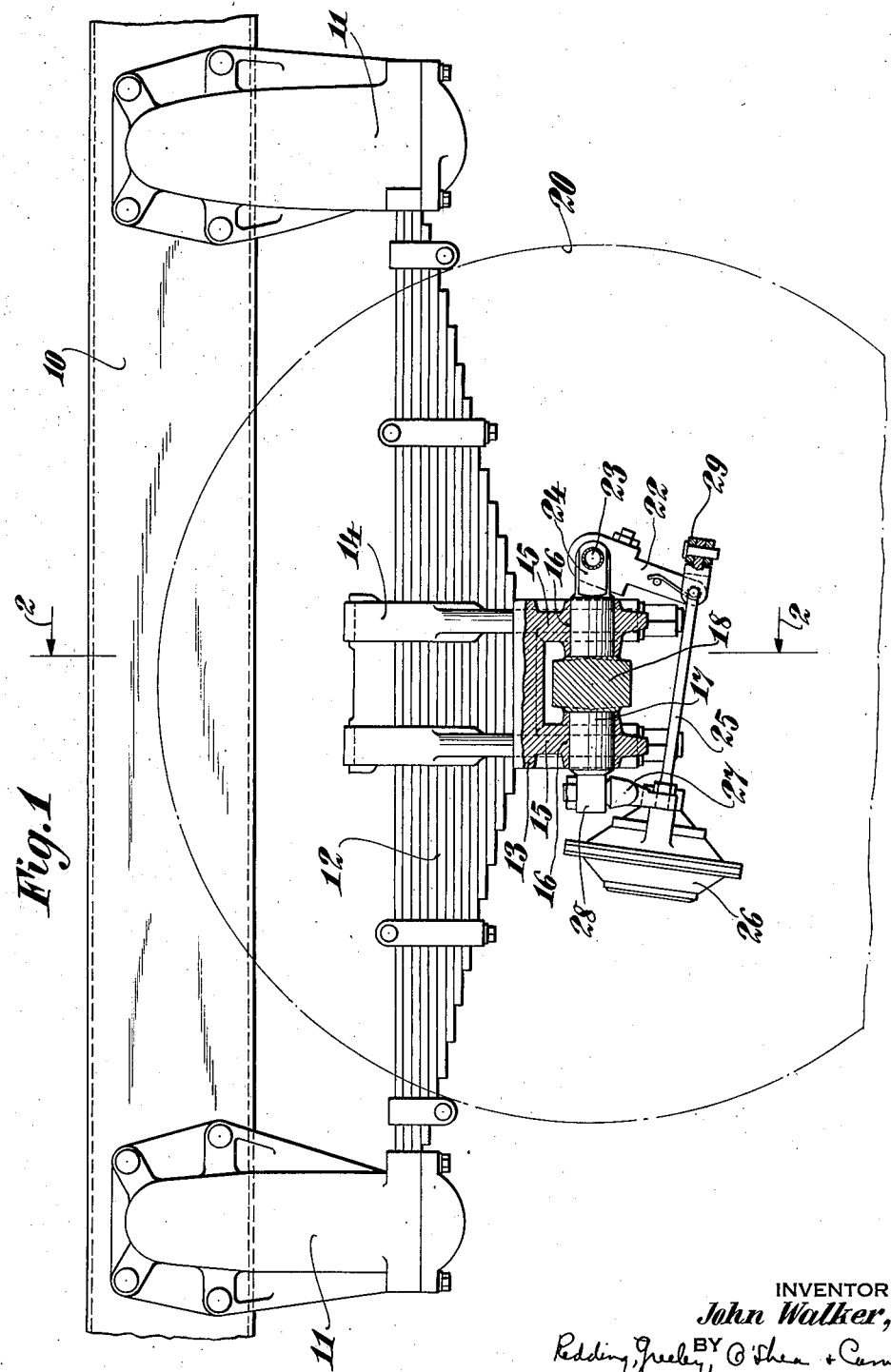
INVENTOR
John Walker,
BY Redding, Greeley, O'Shea & Campbell
HIS ATTORNEYS

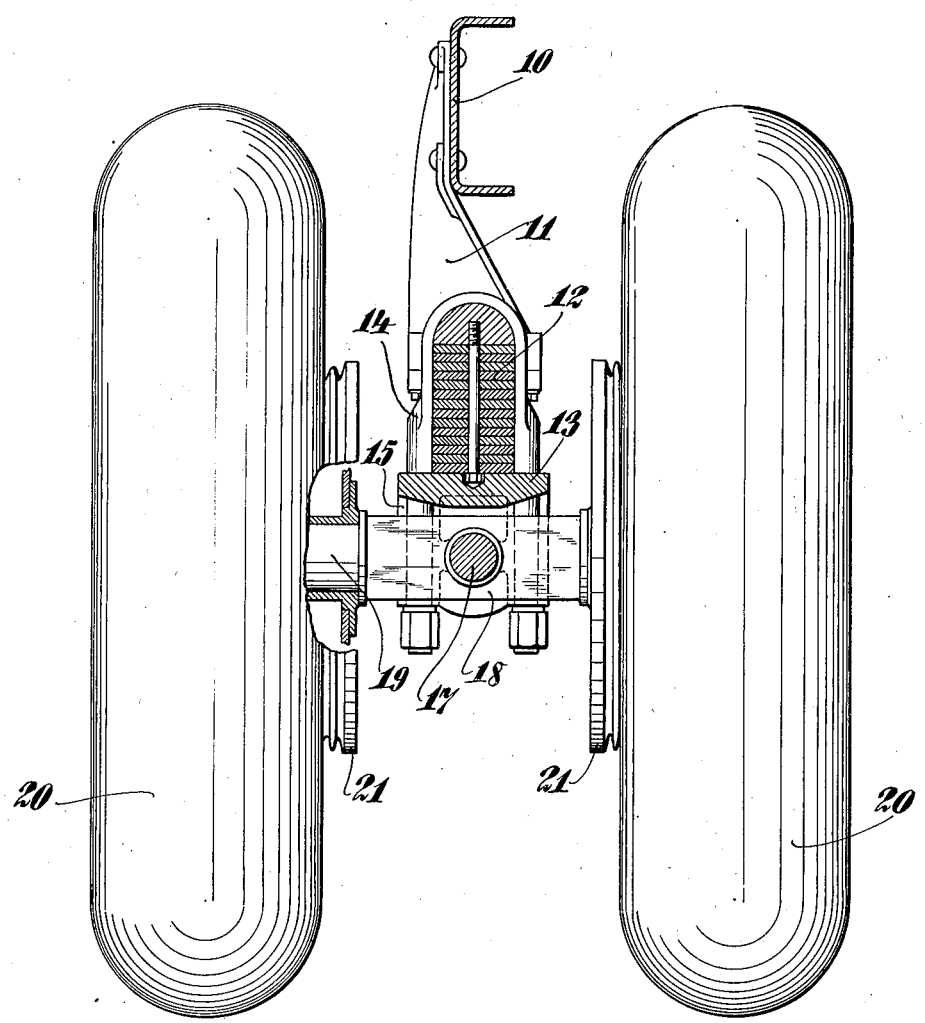

Patented June 13, 1933

1,913,822

UNITED STATES PATENT OFFICE

JOHN WALKER, OF WESTFIELD, NEW JERSEY, ASSIGNOR TO INTERNATIONAL MOTOR COMPANY, OF NEW YORK, N. Y., A CORPORATION OF DELAWARE

TILTING AXLE AND WHEEL MOUNTING

Application filed October 5, 1932. Serial No. 636,350.

The present invention relates to wheel mountings for motor vehicles and embodies, more specifically, an improved mounting for dual wheels whereby a common mounting means is provided between the wheels and provision is made for free movement of the wheels with respect to the common mounting means.

In this connection, the common use of dual wheels on motor vehicles now in use has materially limited the frame width of such vehicles and rendered the same comparatively unstable because of the relatively small distance between the spring centers as compared with the over-hanging width of the vehicle body. Dual wheels have also been unsatisfactory in that both tires of a dual wheel structure have not been uniformly loaded and not been mounted to roll independently, thus subjecting the tires to unequal wear.

The foregoing disadvantages are overcome by the present construction wherein provision is made for mounting the vehicle frame between the wheels of a dual wheel assembly and affording a mounting structure for the wheels to permit each wheel to roll independently and thus share the load equally with other wheels at the same time permitting a degree of rocking motion upon a longitudinal axis.

An object of the invention, accordingly, is to provide a dual wheel structure wherein provision is made for subjecting each wheel of a dual wheel assembly to equal loads.

A further object of the invention is to provide a dual wheel structure of the above character wherein provision is made for affording a greater width of vehicle frame than possible with existing wheel mountings.

A further object of the invention is to provide a dual wheel mounting wherein rocking motion is afforded upon a longitudinal axis to permit the wheels of a dual wheel assembly to conform to the road surface over which the wheels pass and thus avoid subjecting the individual wheels to severe stresses.

A further object of the invention is to provide a dual wheel mounting of the above character in combination with a brake mounting mechanism whereby full apportionment of load is obtained between wheels, as well as an effective braking operation on each wheel.

Further objects, not specifically enumerated above, will be apparent as the invention is described in greater detail in connection with the accompanying drawings wherein:

Figure 1 is a view in side elevation, partly broken away and in section showing a dual wheel mounting constructed in accordance with the present invention.

Figure 2 is a view in section, taken on line 2—2 of Figure 1, and looking in the direction of the arrows.

With reference to the above drawings, a vehicle frame is shown at 10 as provided with spring mounting means 11 in which the ends of a spring 12 are secured. The spring is provided with a bracket 13 having straps 14 which secure the bracket to the spring.

The bracket 13 is provided with spaced bearing plates 15 within which trunnion bearings 16 are formed. A rock shaft 17 is journaled within the bearings 16 and formed with a cross arm 18 upon the ends 19 of which wheels 20 are journaled.

The wheels 20 are thus adapted to rock about the axis of shaft 17, as well as rotate in planes perpendicular to the axis of arm 18. Inasmuch as the wheels are independently journaled upon arm 18, deleterious stresses upon the wheels and tires are relieved at all times because each wheel may rotate independently of the other. Furthermore, the capacity of the wheel to rock about shaft 17 enables each wheel to assume its share of the load under all conditions regardless of the condition of the terrain over which the wheels pass. By mounting the spring 12 between the wheels, the frame members 10 may be spaced a greater distance apart than heretofore possible, and the stability of the vehicle is thus greatly increased.

It is contemplated that each will be provided with braking means 21 which may be actuated by a lever 22 journaled at 23 upon an extension 24 of shaft 17. Lever 22 may be actuated by a rod 25, the motion of which may be controlled by a suitable power actuating device 26 which may be mounted upon a bracket 27 secured to an extension 28 upon the end of shaft 17 distant from the extension 24. In this manner, the independently functioning wheels may have brake mechanism applied thereto and actuated from a common actuating means, such as lever 22. Obviously, a suitable equalizing mechanism may be provided between the common brake actuating lever 22 and the several brake mechanisms 21, such mechanism taking the form of an equalizer beam which may be actuated by lever 22 and connected adjacent its ends to the brake mechanisms. Such beam is indicated at 29 in Figure 1.

While the invention has been described with specific reference to the accompanying drawings, it is not to be limited, save as defined in the appended claims.

I claim as my invention:

1. A plurality of vehicle wheels, a spring upon which the wheels are mounted, an arm to journal the wheels independently on opposite sides of the spring, a shaft on the arm, a bracket on the spring having longitudinally spaced plates formed with trunnion bearings to receive the shaft, and brake actuating means mounted to move with the shaft.

2. A plurality of vehicle wheels, a spring upon which the wheels are mounted, an arm to journal the wheels independently on opposite sides of the spring, a shaft on the arm, a bracket on the spring having longitudinally spaced plates formed with trunnion bearings to receive the shaft, extensions on the ends of the shaft, and brake actuating means mounted on the extensions.

This specification signed this 1st day of October, A. D. 1932.

JOHN WALKER.